United States Patent
Ozeki et al.

(10) Patent No.: US 7,252,137 B2
(45) Date of Patent: Aug. 7, 2007

(54) AIR CONDITIONING UNIT AND AIR CONDITIONING SYSTEM FOR A VEHICLE

(75) Inventors: Yukio Ozeki, Ashikaga (JP); Toshio Ohashi, Sano (JP); Masato Ohno, Sano (JP); Manabu Uomoto, Tatebayashi (JP); Masaharu Onda, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 414 days.

(21) Appl. No.: 10/765,853

(22) Filed: Jan. 29, 2004

(65) Prior Publication Data

US 2004/0182561 A1    Sep. 23, 2004

(30) Foreign Application Priority Data

Jan. 31, 2003    (JP) .............................. 2003-024679

(51) Int. Cl.
*B60H 1/00* (2006.01)
*B61D 27/00* (2006.01)

(52) U.S. Cl. ........................... 165/42; 165/202; 165/58; 62/244; 454/161

(58) Field of Classification Search .................. 165/41, 165/42, 43, 44, 202, 203, 204, 58; 62/244; 454/160, 161
See application file for complete search history.

(56) References Cited

U.S. PATENT DOCUMENTS 5,385,137 A * 1/1995 Christensen et al. ........ 165/162
6,357,249 B1    3/2002 Robinson et al.

FOREIGN PATENT DOCUMENTS

| CH | 183 144 | 3/1936 |
|----|---------|--------|
| DE | 2 112 038 | 9/1971 |
| EP | 0 816 788 A2 | 1/1998 |
| JP | 9-123748 A | 5/1997 |
| JP | 10-19480 | * 1/1998 |

* cited by examiner

*Primary Examiner*—Ljiljana Ciric
(74) *Attorney, Agent, or Firm*—Foley & Lardner LLP

(57) ABSTRACT

An air conditioning unit includes an air conditioning casing formed with an inlet and an outlet. The air conditioning casing allows air to flow in the air conditioning casing from the inlet to the outlet. The conditioning unit also includes an evaporator arranged in the air conditioning casing and having substantially a U-shape and a U-Shaped outer air flow path provided on an outer side of the U-shaped evaporator in the air conditioning casing. An inner air flow path is provided on an inner side of the U-shaped evaporator in the air conditioning casing and a heater core is arranged in the air conditioning casing.

24 Claims, 8 Drawing Sheets

AIR CONDITIONING UNIT AND AIR CONDITIONING SYSTEM FOR A VEHICLE

CROSS REFERENCE TO RELATED APPLICATIONS

This application is based upon and claims the benefit of priority from the prior Japanese Patent Application No. P2003-024679 filed on Jan. 31, 2003; the entire contents of which are incorporated herein by reference.

BACKGROUND OF THE INVENTION

1. Field of the Invention

The present invention relates to an air conditioning unit for a vehicle and an air conditioning system employing the air conditioning unit.

2. Description of Related Art

Recent vehicles are equipped with an air conditioning system component in an instrument panel in front of a front seat. The instrument panel is usually provided with various electronic instruments of the vehicle, and such instruments restrict the space for the air conditioning system in the instrument panel.

Conventionally, an air conditioning system in an instrument panel of a vehicle is laid out by placing an air conditioning unit having an evaporator and a heater core at a widthwise center of the vehicle and by arranging a fan unit on the front passenger seat side of the air conditioning unit (for example, FIG. 26 of Japanese Unexamined Patent Application Publication No. Hei-9-123748). This layout concentrates the evaporator and heater core at the widthwise center of the vehicle to secure space in the instrument panel. This is called a centralized layout.

To meet a recent requirement for decreasing noise in vehicle cabins (passenger compartment), there is an increasing need to decrease noise produced by vehicle air conditioning systems. Decreasing the noise of an air conditioning system may be achieved by reducing an air flow rate of the air conditioning system. Reducing the air flow rate, however, deteriorates the performance of the air conditioning system. There is a necessity for an air conditioning system that achieves high air flow rates and low noise.

To achieve low noise and high air flow rates for an air conditioning system, the most effective way may be enlarging the ventilating area of a heat exchanger (in particular, an evaporator) in the air conditioning system. To enlarge the ventilating area, simply increasing, for example, the width of the evaporator leads to the increase of a widthwise space occupied by the evaporator, to thereby increase the size of the air conditioning unit. This makes it difficult to provide an installation space for the air conditioning system in a vehicle and dose not substantially provide low noise and high air flow rates for the air conditioning system. In the centralized layout, the large evaporator prevents providing a foot space for a driver's seat or a glove box space in front of a passenger's seat.

An object of the present invention is to provide an air conditioning unit and air conditioning system for a vehicle, capable of achieving low noise and high air flow rates and minimizing the outside dimensions of the air conditioning unit.

SUMMARY OF THE INVENTION

In order to accomplish the object, an aspect of the present invention provides an air conditioning unit for a vehicle, including an air conditioning casing having flow paths therein, an evaporator arranged in the air conditioning casing and having a substantially U-shape, an outer flow path provided on the outer side of the U-shaped evaporator on one of the upstream and downstream sides of an air flow of the U-shaped evaporator, an inner flow path secured on the inner side of the U-shaped evaporator on one of the downstream and upstream sides of the air flow of the U-shaped evaporator, and a heater core arranged on the downstream side of the air flow of the U-shaped evaporator.

DETAILED DESCRIPTION OF EMBODIMENTS

Embodiments of the present invention will be described with reference to the accompanying drawings.

First Embodiment

Figure 1:
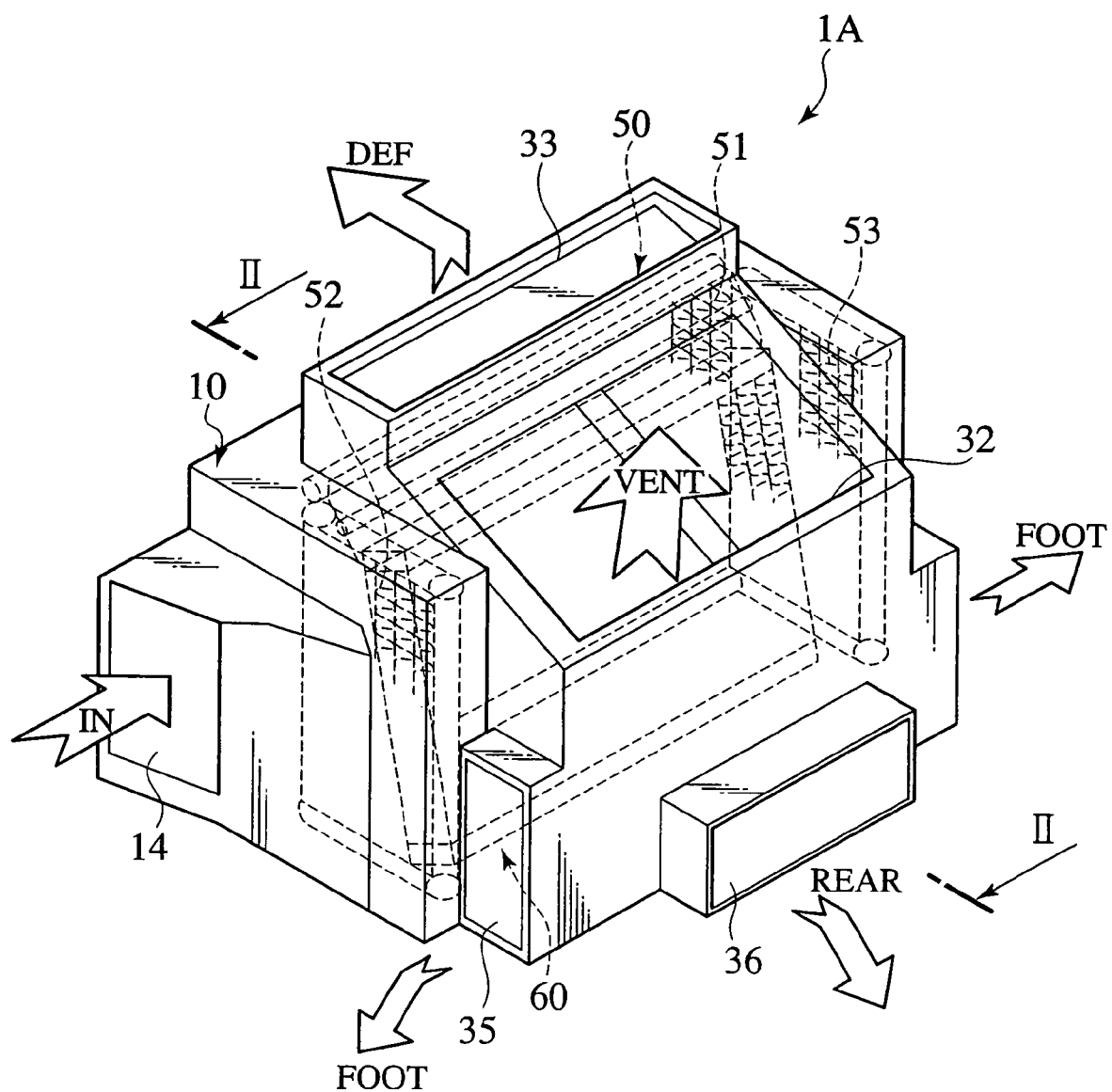
FIG. 1 is a perspective view schematically showing an air conditioning unit according to a first embodiment of the present invention.
Figure 2:
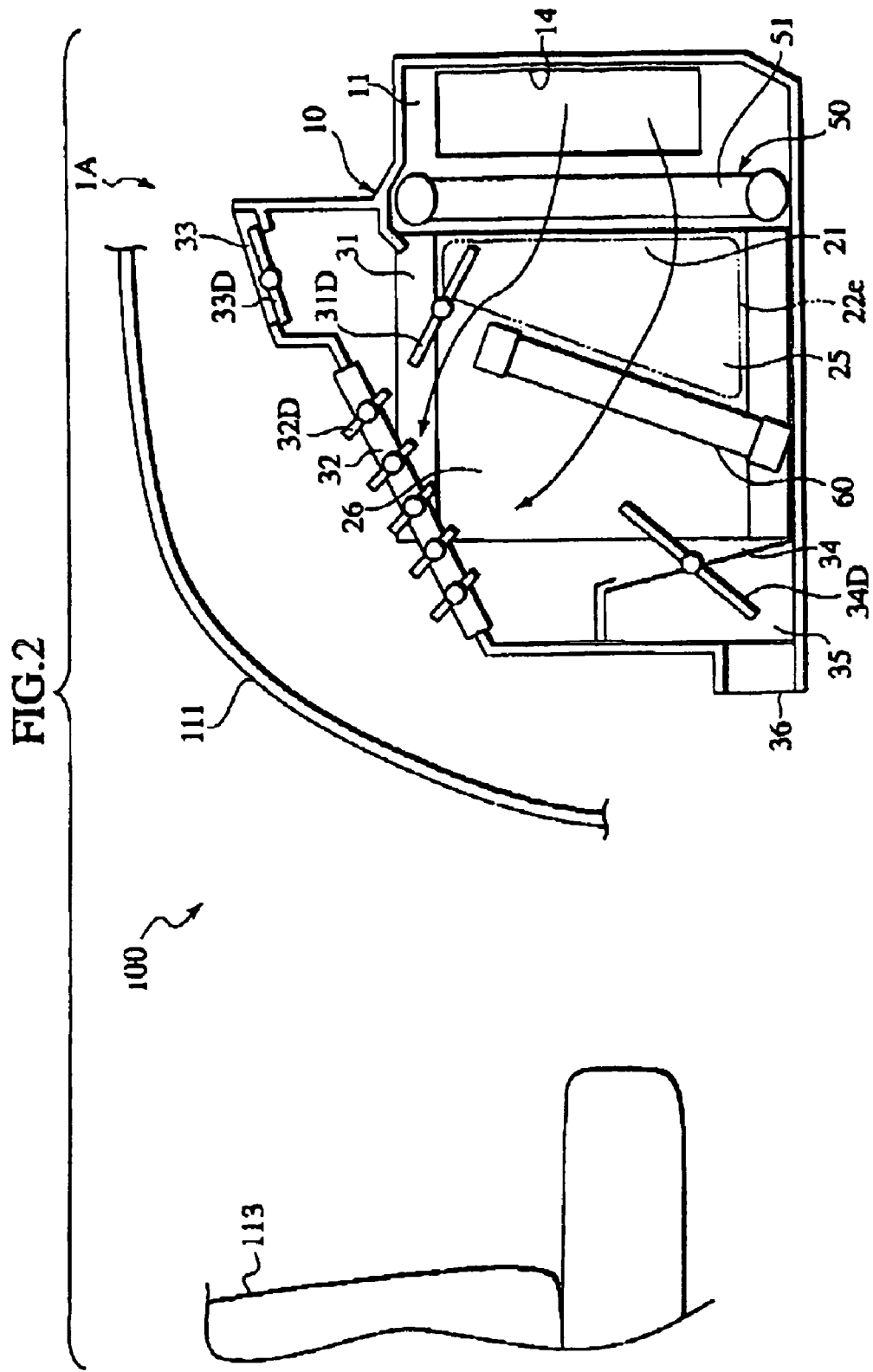
FIG. 2 is a sectional view taken along a line II-II of FIG. 1.
Figure 3:
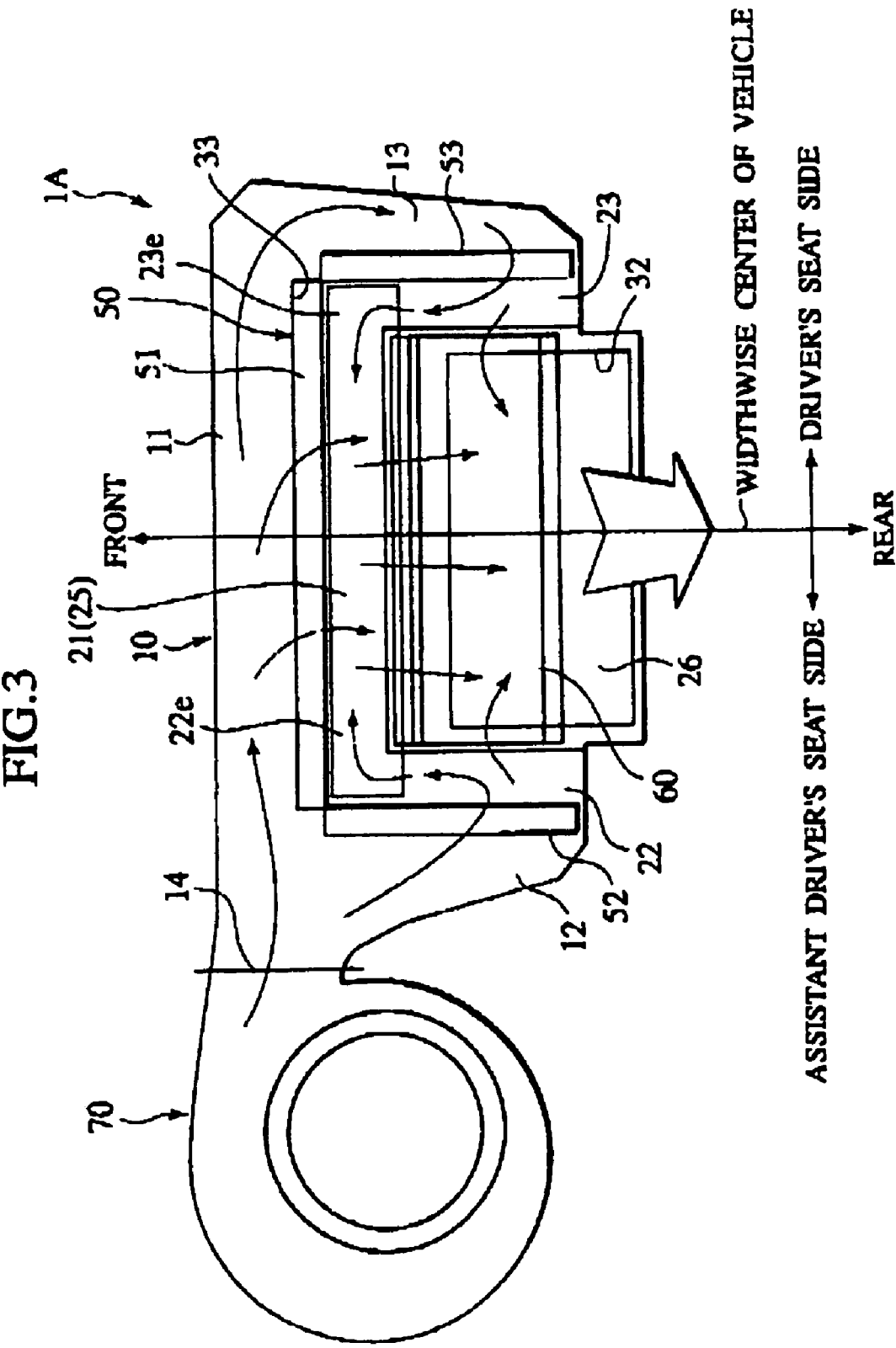
FIG. 3 is a plan view schematically showing an air conditioning system for a vehicle formed by combining the air conditioning unit of FIG. 1 and a fan unit.

FIGS. 1 and 2 show an air conditioning unit 1A according to the first embodiment of the present invention, and FIG. 3 shows an air conditioning system employing the air conditioning unit 1A and a fan unit 70. The air conditioning unit 1A includes a box-like air conditioning casing 10.

The air conditioning casing 10 incorporates an evaporator 50 serving as a cooling heat exchanger to cool air. The evaporator 50 is vertically arranged in an upright posture and is configured in a substantially U-shape in a plan view. In FIG. 3, the U-shaped evaporator 50 is a combination of three flat evaporators 51, 52, and 53. The center evaporator 51 is positioned at the center of the U-shape and the side evaporators 52 and 53 are arranged on each side of the center evaporator 51.

In the air conditioning casing 10, each ventilating face of the evaporators 51, 52, and 53 substantially orthogonally pass air because an outer flow path and an inner flow path are provided on the outer and inner sides of the U-shaped evaporator 50, respectively. The outer flow path consists of a center path 11 on the outer side of the center evaporator 51 and side paths 12 and 13 on the outer sides of the side evaporators 52 and 53, respectively. As a result, the outer flow path is a substantially U-shaped space in a plan view.

The inner flow path consists of an inner center path 21 on the inner side of the center evaporator 51 and inner side paths 22 and 23 on the inner sides of the side evaporators 52 and 53, respectively. As a result, the inner flow path is a U-shaped space in a plan view. The inner side paths 22 and 23 are defined by walls 22H and 23H spaced from the inner sides of the evaporators 52 and 53, respectively. The inner center path 21 is a space.

According to the first embodiment, the outer flow path is on the upstream side of the U-shaped evaporator 50 in an air flow direction, and the inner flow path is on the downstream side thereof. On the downstream side of the evaporator 50, a heater core 60 is arranged to serve as a heating heat exchanger to heat air. The heater core 60 is in a space on the inner side of the U-shaped evaporator 50. In FIG. 2, the heater core 60 leans toward a back ventilating face of the center evaporator 51.

Between the center evaporator 51 and the heater core 60, a center space 25 is secured to merge air passing through the evaporator 50 and inner flow paths 21, 22, and 23 and guide the merged air to a front ventilating face of the heater core 60.

More precisely, the inner center path 21 is directly continuous to the center space 25, and the inner side paths 22 and 23 join the center space 25 through connections 22e and 23e, respectively. According to this embodiment, the center evaporator 51 and heater core 60 are arranged closely adjacent to each other, and therefore, the inner center path 21 is substantially the same as the center space 25.

In FIG. 2, a bypass 31 is formed over the heater core 60. The bypass 31 directly guides at least part of the air introduced in the center space 25 into an air mixing space 26 by bypassing the heater core 60. The bypass 31 has a butterfly bypass door 31D to open and close the bypass 31. The air mixing space 26 is behind (downstream side) the heater core 60, to mix the air passed through the bypass 31 with air passed through the heater core 60.

The air conditioning casing 10 has a vent 32 and a foot outlet 34 that are branched from the air mixing space 26. The vent 32 has a vent door 32D to open and close the vent 32. The foot outlet 34 has a foot door 34D to open and close the foot outlet 34.

A downstream part of the foot outlet 34 is branched into a front foot outlet 35 and a rear foot outlet 36. Just above the bypass door 31D, there is a defroster outlet 33 having a defroster door 33D.

The air conditioning casing 10 has an air inlet 14 to introduce air from the fan unit 70. The inlet 14 is arranged at a corner between the center path 11 and the left path 12. The inlet 14 is so oriented as to directly guide air in an extending direction of the center path 11.

To install the air conditioning unit 1A in a vehicle 100, the fan unit 70 is arranged beside the air conditioning unit 1A, and the outlet of the fan unit 70 is connected to the inlet 14 of the air conditioning unit 1A as shown in FIG. 3. In this state, the air conditioning unit 1A is set at a widthwise center of an instrument panel 111 in front of a front seat 113 in the vehicle 100. At this time, an opening of the U-shaped evaporator 50 is oriented toward the rear of the vehicle 100, so that the fan unit 70 may be on the passenger seat side.

Operation of the first embodiment will be explained. When the fan unit 70 is turned on, air from the fan unit 70 is guided into the air conditioning casing 10 through the air inlet 14. The air introduced into the air conditioning casing 10 flows through the outer flow path comprising the center path 11 and side paths 12 and 13, the evaporators 51, 52, and 53, and the inner flow paths 21, 22, and 23. During this operation, the air is dehumidified and cooled by the evaporators 51, 52, and 53. The conditioned air passed through the evaporators 51, 52, and 53 flows through the inner flow paths 21, 22, and 23 and merges in the center space 25 in front of the heater core 60. The merged air in the center space 25 flows through the heater core 60 into the air mixing space 26. The air that has flowed into the air mixing space 26 is blown into the vehicle cabin from at least one of the outlets 32, 33, and 34 that is open.

For example, in a full cool mode, the heater core 60 is not set to a heating mode. Namely, no heating medium is supplied to the heater core 60, which therefore passes the conditioned air as it is. The bypass door 31D is closed or opened. As a result, the cooled air is blown into the cabin.

In a heat mode, the heater core 60 is set to the heating mode. Namely, a heating medium is supplied to the heater core 60, which passes and heats the air, and the bypass door 31D is opened. As a result, the air passed through the evaporator 50 is heated by the heater core 60 and is blown into the cabin.

In an air mixing mode, the heater core 60 is set to the heating mode, and the bypass door 31D is opened to directly guide part of the air passed through the evaporator 50 into the air mixing space 26. As a result, the heated air passed through the heater core 60 and the cooled air passed through the bypass 31 are mixed with each other in the air mixing space 26, and the mixed air is blown into the vehicle cabin. The temperature of air to be blown into the cabin is adjustable by controlling the opening of the bypass door 31D.

The effect of the first embodiment will be explained. The air conditioning system for a vehicle according to the first embodiment employs the substantially U-shaped evaporator 50. The center evaporator 51 serves as a base, and the side evaporators 52 and 53 increase the ventilating area, to thereby achieve low noise and high air flow rates. Compared with evaporators arranged in a horizontal row, the substantially U-shaped evaporator 50 has a reduced width. This minimizes the width of the air conditioning casing 10, i.e., the width of the air conditioning unit 1A. Accordingly, the air conditioning system according to the first embodiment can achieve low noise and high air flow rates, and minimize the width of the air conditioning unit 1A.

The embodiment arranges the evaporator 50 and heater core 60 in upright postures, so that air may horizontally pass therethrough to achieve good heat exchanging performance.

The heater core 60 is forwardly inclined to enlarge the ventilating area of the heater core 60 without increasing a space occupied thereby. This increases the heat exchanging performance of the heater core 60.

The heater core 60 faces the center evaporator 51, to simplify a flow path layout and make the air conditioning unit 1A compact. In particular, the heater core 60 is arranged in an inner space of the U-shaped evaporator 50, to reduce the dimensions of the air conditioning unit 1A in a direction orthogonal to the heater core 60. According to the embodiment, the dimensions of the air conditioning unit 1A are reduced in a front-rear direction of the vehicle.

Since the width of the air conditioning unit 1A is reduced as mentioned above, the air conditioning unit 1A and fan unit 70 can be arranged in the centralized layout as shown in FIG. 3 to sufficiently provide a foot space in front of a driver's sheet and a glove box space in front of an passenger seat.

Second Embodiment

Figure 4:
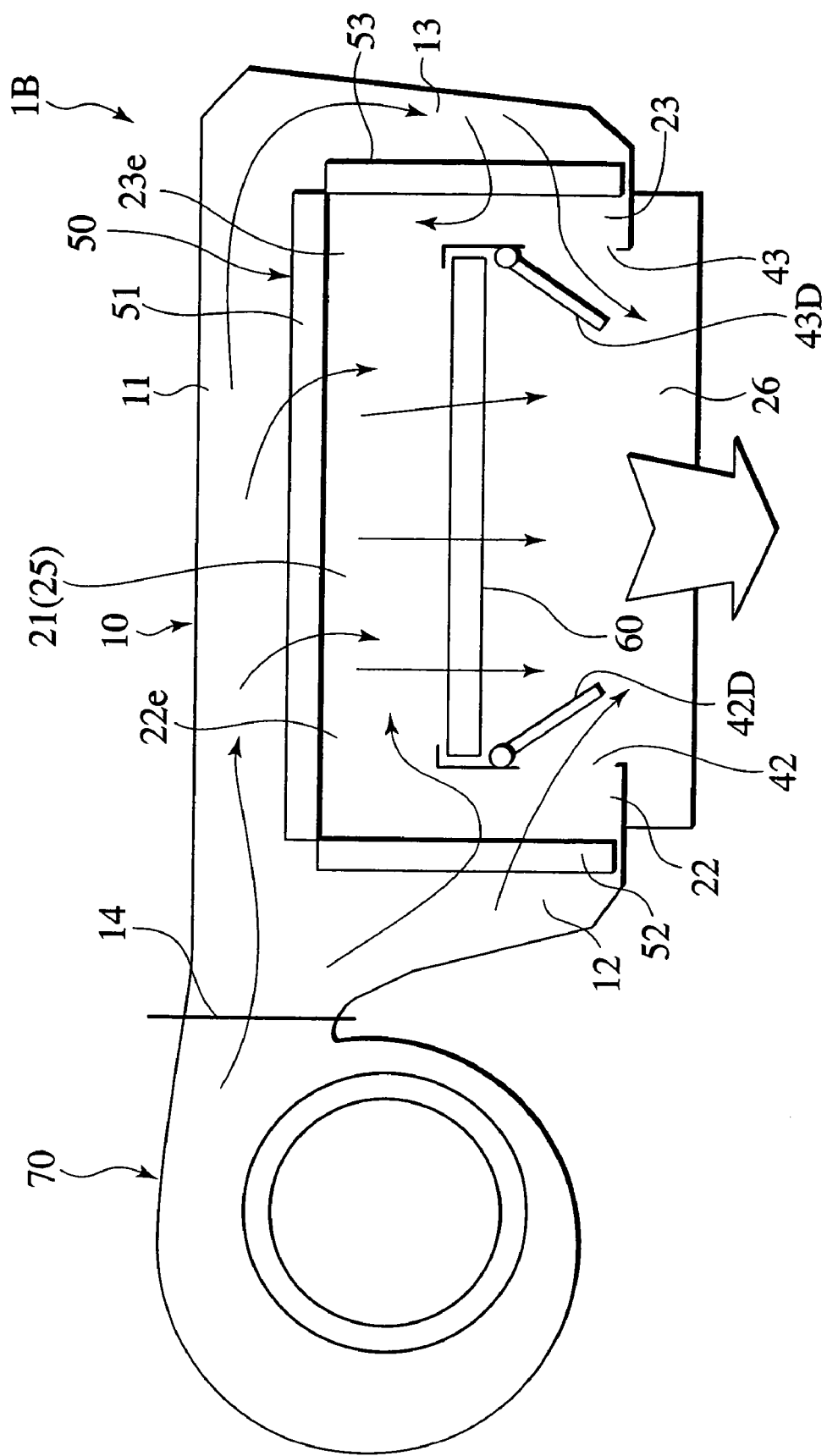
FIG. 4 is a plan view schematically showing an air conditioning system for a vehicle formed by combining an air conditioning unit according to a second embodiment of the present invention and a fan unit.

In the air conditioning unit 1A according to the first embodiment, the bypass 31 and bypass door 31D are arranged over the heater core 60. On the other hand, an air conditioning unit 1B according to the second embodiment of the present invention shown in FIG. 4 arranges bypasses 42 and 43 in inner flow paths 22 and 23, respectively. The bypasses 42 and 43 are provided with bypass doors 42D and 43D to open and close the bypasses 42 and 43, respectively.

The bypass doors 42D and 43D are opened to guide cooled air passed through the evaporators 52 and 53 into an air mixing space 26 where the cooled air is mixed with heated air passed through a heater core 60.

Third Embodiment

Figure 5:
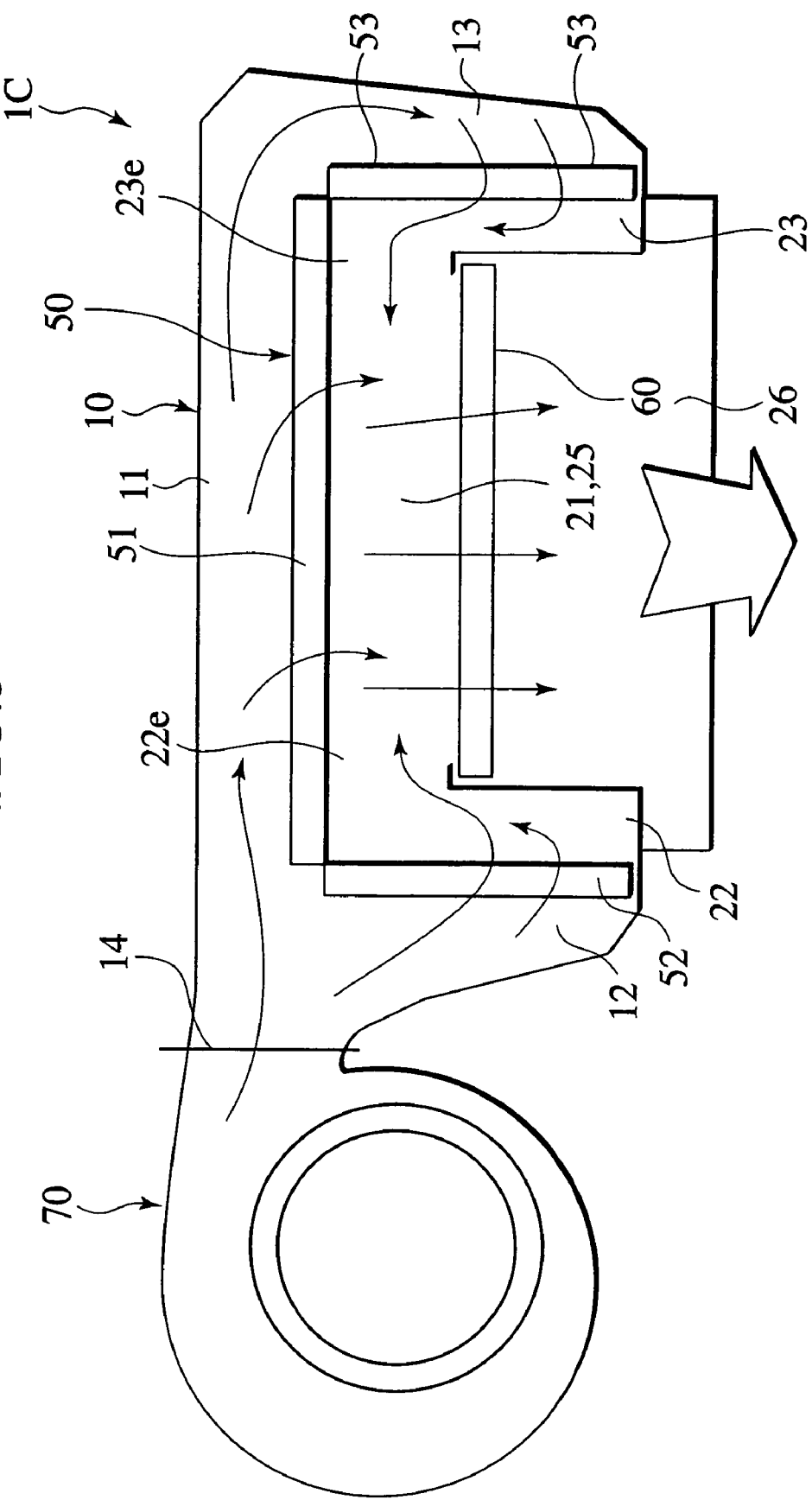
FIG. 5 is a plan view schematically showing an air conditioning system for a vehicle formed by combining an air conditioning unit according to a third embodiment of the present invention and a fan unit.

FIG. 5 shows an air conditioning unit IC according to the third embodiment of the present invention. The third embodiment has no bypass. The third embodiment entirely passes all the air from evaporators 51, 52, and 53 through a heater core 60. In this case, the temperature of the air is adjusted by controlling the flow rate of a heating medium supplied to the heater core 60.

Fourth Embodiment

Figure 6:
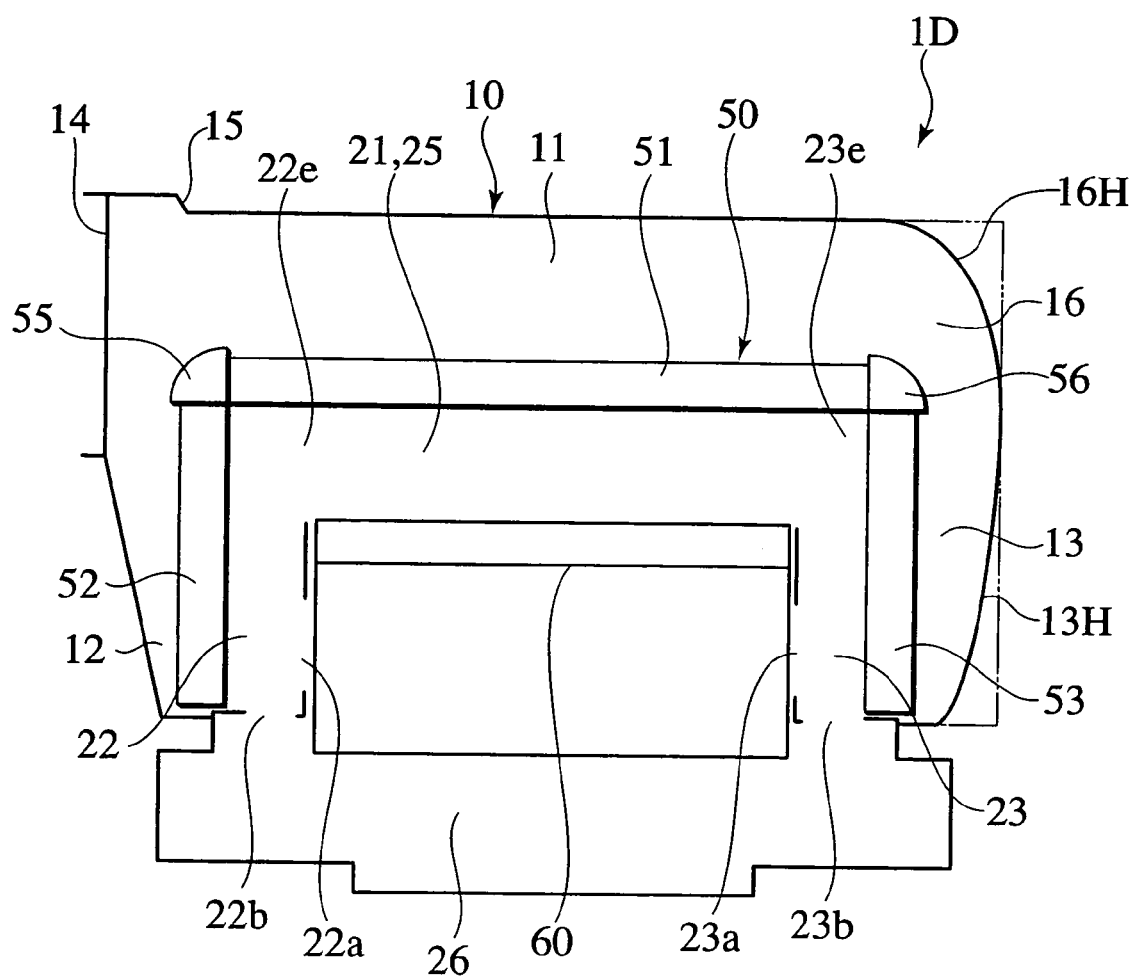
FIG. 6 is a plan view schematically showing an air conditioning unit according to a fourth embodiment of the present invention.

FIG. 6 shows an air conditioning unit 1D according to the fourth embodiment of the present invention. This embodiment shapes flow paths in an air conditioning casing 10 so as to smooth air flow and improve air-conditioning performance.

The air conditioning unit 1D of the fourth embodiment has a contraction (step) 15 at a connection between an air inlet 14 and a center flow path 11, to increase air distribution to the left path 12.

In addition, each of the left and right paths 12 and 13 is tapered so as to become narrower toward the front end thereof. According to this embodiment, outer walls 12H and 13H of the left and right paths 12 and 13 are tapered and constricted toward the front ends of the paths 12 and 13. Instead of slanting the outer walls 12H and 13H, side evaporators 52 and 53 may be widened to narrow the side paths 12 and 13 toward the ends thereof.

Further, a corner 16 between the center path 11 and the right path 13 is rounded by a curved outer wall 16H. The outer wall 13H is inwardly curved continuously from the curved wall 16H.

Moreover, at intersections between a center evaporator 51 and the side evaporators 52 and 53, smoothers 55 and 56 are attached to smooth the air flow. Inner side paths 22 and 23 are provided with bypasses 22a, 22b, 23a, and 23b.

Figure 7:
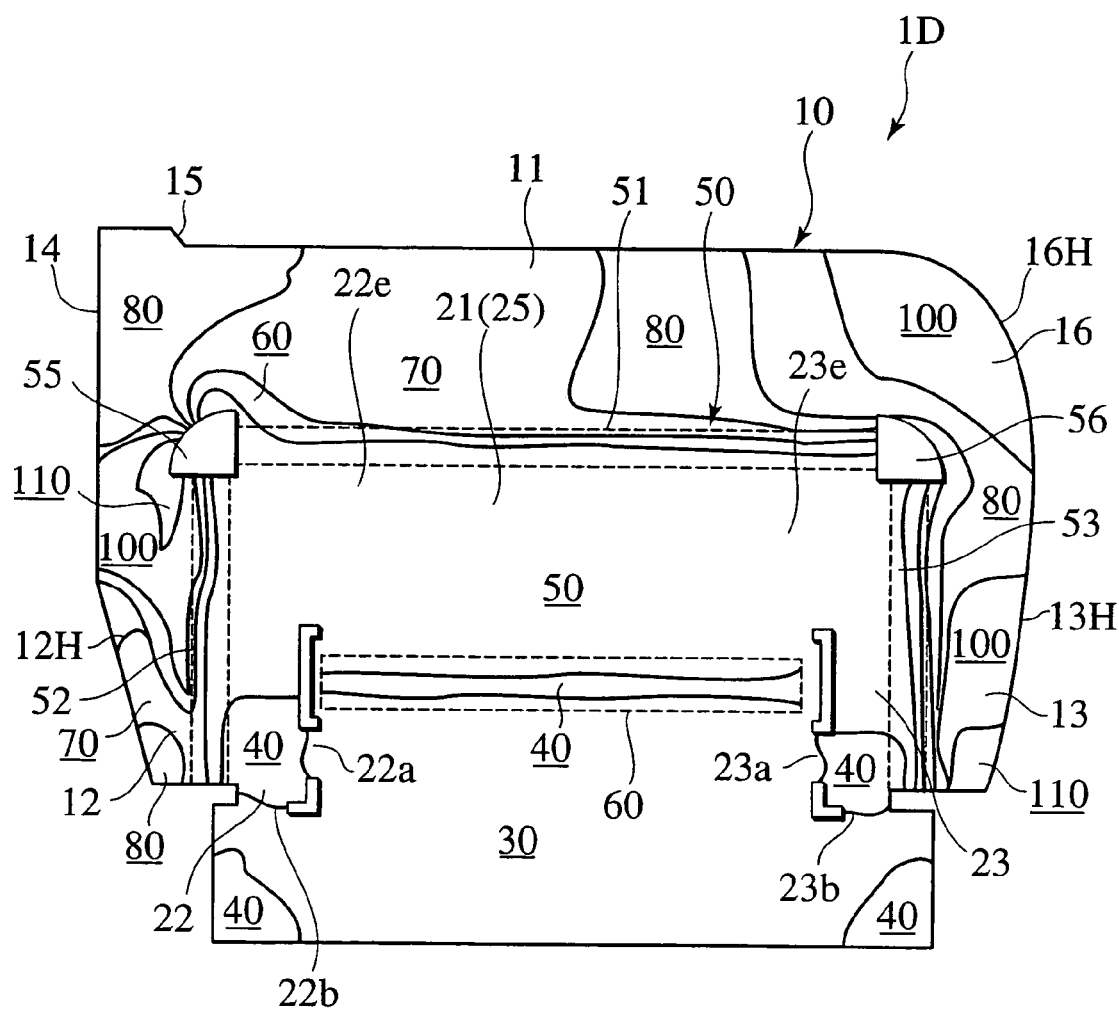
FIG. 7 is a view showing a static pressure distribution in the air conditioning unit of the fourth embodiment.
Figure 8:
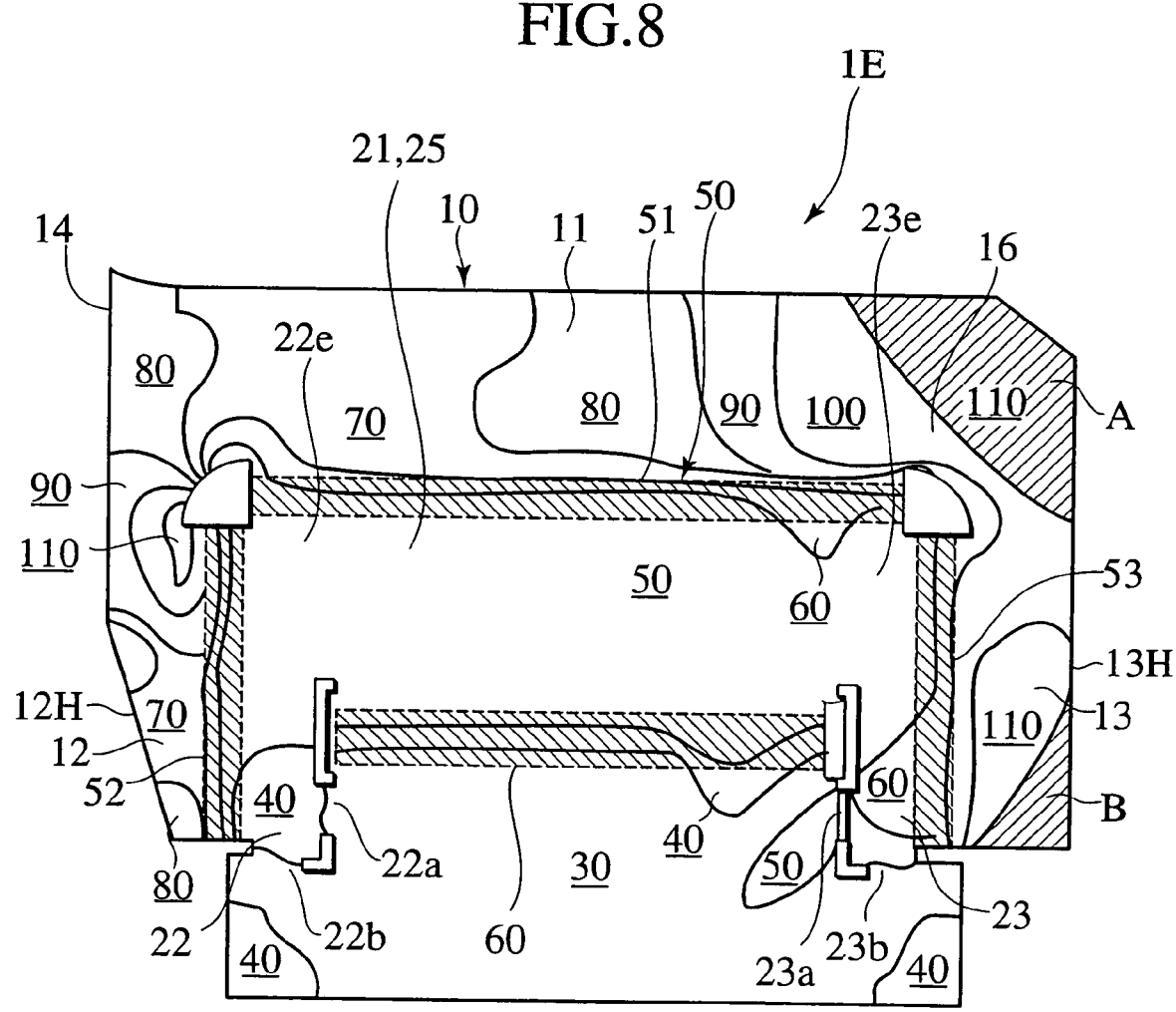
FIG. 8 is a view showing a static pressure distribution in another air conditioning unit for comparison with FIG. 7.

FIG. 7 shows a static pressure distribution in the air conditioning unit 1D of the fourth embodiment, and FIG. 8 shows a static pressure distribution in an air conditioning unit 1E serving as a comparison example (the air conditioning unit 1E resembles the air conditioning unit 1A of the first embodiment).

Comparing FIGS. 7 and 8 with each other, it is understood that high static pressure components are averaged in the air conditioning unit 1D of FIG. 7 and a uniform static pressure is achieved just after the evaporator 50. This will be explained in more detail.

In the air conditioning unit 1E of FIG. 8, air from an air inlet 14 mostly tends to flow into a center path 11 instead of a left path 12 due to inertial. In the air conditioning unit 1D of FIG. 7, the contraction 15 is at the connection between the air inlet 14 and the center path 11, to properly adjust an air distribution and provide sufficient air to the left path 12 also.

In the air conditioning unit 1E of FIG. 8, a corner 16 from the center path 11 to a right path 13 and the front ends of the side paths 12 and 13 are substantially dead ends for air flow. Accordingly, due to the large force provided from the fan unit 70 and large flow resistance by evaporators 51, 52, and 53, the dead ends form high-pressure zones (hatched zones A and B). This causes an uneven flow rate distribution around the evaporators 51, 52, and 53. On the other hand, the air conditioning unit 1D of FIG. 7 promotes a smooth flow of air as shown in FIG. 7 and improves static pressure distributions in front of and behind the evaporator 50.

In each of the above embodiments, the evaporator is arranged in substantially a U-shape. The present invention also allows other arrangements in which the side evaporators are not completely orthogonal to the center evaporator.

The present invention has been explained in detail with reference to the embodiments. As is apparent for those skilled in the art, these embodiments are not intended to limit the present invention. The present invention is achievable in other forms without departing from the spirit and scope thereof specified in the appended claims. This specification serves only for exemplary explanation of the present invention and is not intended to restrict the present invention.

As disclosed, the invention employs an evaporator substantially having a U-shape. Unlike evaporators arranged in a horizontal row, the U-shaped evaporator has a short width and an increased ventilating area. This configuration achieves low noise and high air flow rates and minimizes the width of an air conditioning casing or an air conditioning unit.

The invention combines a plurality of flat evaporators into a U-shaped evaporator, which is easy to manufacture.

Three flat evaporators are combined into a substantially U-shaped evaporator, which is easy to manufacturer and has a simplest structure.

A heater core is arranged to face a central one of the evaporators arranged in a U-shape. This configuration provides the air conditioning unit with simple flow paths and a simple structure.

The heater core is arranged in a space on the inner side of the U-shaped evaporator, to reduce the dimensions of the air conditioning unit. The evaporator and heater core may be installed in a front-rear direction of a vehicle to reduce the dimensions of the air conditioning unit in the front-rear direction.

The heater core is inclined relative to the center evaporator, to increase the ventilating area and heat-exchanging capacity of the heater core without increasing a space occupied by the heater core.

The evaporator and heater core are arranged in upright postures to horizontally pass air therethrough, thereby improving heat-exchanging performance. The heater core may be inclined so that a top end of the heater core is closer to the center evaporator and a lower end of the heater core is farther from the center evaporator. In this case, the heater core leans toward the center evaporator so that air passed through the heater core may flow upwardly. This is advantageous when an outlet of the air conditioning unit is positioned above the heater core.

Air is passed through the center evaporator and side evaporators into a center space and then through the heater core. Namely, the air passed through the evaporators is entirely passed through the heater core. In this case, the temperature of the air is adjustable by controlling the quantity of heating medium supplied to the heater core.

A bypass door may be opened to blow part of the conditioned air passed through the evaporator into a vehicle cabin by bypassing the heater core.

A bypass may be formed over the heater core. A vent may be formed on a top face of the air conditioning unit, to blow cooled air passed through the evaporator from the vent. This configuration improves the maximum flow rate of cool air passing through the vent.

The bypass doors may be opened to directly blow part of the conditioned air passed through the side evaporators into the cabin by bypassing the heater core.

An air mixing space is provided downstream from the heater core, to mix conditioned air passed through the bypass with conditioned air passed through the heater core. The bypass door is controllable to adjust a mixing ratio of the cool air and hot air and control the temperature of air blown from an outlet of the air conditioning unit into the cabin.

The air mixing space is provided downstream from the heater core, to mix conditioned air passed through the bypass with conditioned air passed through the heater core. The bypass door is controllable to adjust a mixing ratio of the cool air and hot air and control the temperature of air blown from an outlet of the air conditioning unit into the cabin.

An outer flow path is provided on the outer side of the evaporator. The outer flow path is a U-shaped space in a plan view, comprising of a center path provided on the outer side of the center evaporator and side paths provided on the outer sides of the side evaporators, respectively. At a corner where the center path connects to one of the side paths, an air inlet is arranged to straightly guide air in an extending direction of the center path. The air inlet is connectable to an outlet of a fan unit. This enables the fan unit to be arranged beside the air conditioning unit. The air conditioning unit and fan unit may be installed side by side in a width direction of the vehicle, to minimize a space in the front-rear direction of the vehicle occupied by an air conditioning system composed of the air conditioning unit and fan unit. With this configuration, the fan unit can properly send air to the evaporator through the space (outer flow path) having a U-shape in a plan view provided on the outer side of the evaporator.

A path contraction is provided at a connection between the air inlet and the center path, to increase air distribution to one side path (the side path closer to the air inlet). This configuration sufficiently sends air to the side path. Namely, air from the air inlet tends to mostly flow to the center path instead of the side path due to inertia. At this time, the path contraction at the connection properly controls air distributions.

The first and second side paths are tapered to make them narrower toward the front ends thereof, thereby properly distributing air to the evaporator. The front end of each path is a substantial dead end for air flow, and therefore, the fan unit sends air having a large pressing force into the center path. At this time, the evaporator demonstrates large air resistance, and the dead ends produce high pressure to make a flow rate distribution of air passed through the evaporator uneven. The path shapes of the present invention can smooth an air flow and improve flow rate distributions.

An outer wall is rounded to provided a curved path along a corner between the center path and one of the side paths, to further improve flow rate distributions. The corner between the center path and the side path forms a substantial dead end for air flow. As a result, the corner causes high pressure to make an uneven flow rate distribution of air passed through the evaporator. The curved path mentioned above can smooth the air flow and improve flow rate distributions.

A smoother part (round part) is arranged at each of the intersections between the center evaporator and the side evaporators, to smooth the air flow. This further improves the flow rate distribution.

The air conditioning unit is arranged at a widthwise center of the vehicle with the fan unit beside the air conditioning unit. Namely, the air conditioning unit is arranged at the widthwise center of the vehicle and the fan unit on the front passenger seat side. This makes the air conditioning system compact in front-rear and vertical directions in the vehicle. Accordingly, the air conditioning system can properly be installed in an instrument panel of the vehicle.

Unlike evaporators arranged in a horizontal row, the evaporator minimizes an installation width and enlarges a ventilating area. This results in minimizing the width of an air conditioning casing or an air conditioning unit and achieves low noise and high air flow rates. The air conditioning unit and a fan unit may be installed in a width direction in a vehicle, to make the air conditioning system compact in vertical and front-rear directions in the vehicle. Therefore, the air conditioning system can properly be installed in an instrument panel of the vehicle.

The evaporator and a heater core are provided at a widthwise center of the instrument panel. This configuration provides foot space for the driver's seat and passenger seat.

What is claimed is:

1. An air conditioning unit, comprising:
   an air conditioning casing formed with an inlet and an outlet;
   a fan unit configured to make an air flow from the inlet to the outlet in the air conditioning casing;
   an evaporator arranged in the air conditioning casing and having substantially a U-shape;
   a U-shaped outer air flow path provided on an outer side of the U-shaped evaporator in the air conditioning casing, and provided on one of an upstream and downstream sides of the air flow from the U-shaped evaporator;
   an inner flow path provided on an inner side of the U-shaped evaporator on one of the downstream and upstream sides of the air flow from the U-shaped evaporator; and
   a heater core arranged on the downstream side of the air flow from the U-shaped evaporator.

2. The air conditioning unit of claim 1, wherein: the U-shaped evaporator is formed of a plurality of evaporators.

3. The air conditioning unit of claim 1, wherein:
   the U-shaped evaporator is formed of a center evaporator and side evaporators arranged on each side of the center evaporator.

4. The air conditioning unit of claim 3, wherein:
   the U-shaped outer air flow path is on the upstream side of the air flow of the U-shaped evaporator and the inner air flow path is on the downstream side of the air flow from the U-shaped evaporator; and
   the heater core is arranged to face the center evaporator.

5. The air conditioning unit of claim 4, further comprising:
   a center space provided between the center evaporator and the heater core, configured to merge air flowing in the inner air flow path so that the merged air in the center space may be entirely passed through the heater core.

6. The air conditioning unit of claim 4, further comprising:
   a center space provided between the center evaporator and the heater core, configured to merge air flowing in the inner air flow path and pass the merged air through the heater core;
   a bypass configured to guide part of the air in the center space toward a downstream space behind the heater core by bypassing the heater core; and
   a bypass door arranged in the bypass, configured to open and close the bypass.

7. The air conditioning unit of claim 6, further comprising:
   an air mixing space provided on the downstream side from the heater core, configured to mix air passed through the bypass with air passed through the heater core.

8. The air conditioning unit of claim 4, wherein:
   the heater core is arranged in a space defined on the inner side of the U-shaped evaporator.

9. The air conditioning unit of claim 8, wherein:
   the heater core is inclined relative to the center evaporator of the U-shaped evaporator and is arranged to face the center evaporator.

10. The air conditioning unit of claim 9, wherein:
    the U-shaped evaporator is arranged in an upright posture and the heater core is inclined relative to the center evaporator and is arranged to face the center evaporator.

11. The air conditioning unit of claim 8, wherein the U-shaped outer air flow path comprises a center path provided on the outer side of the center evaporator and first and second side paths provided on the outer sides of the side evaporators, respectively, the air conditioning unit further comprising:
    an air inlet formed on the air conditioning casing at a corner between the center path and the first side path, configured to guide air in a straight extending direction of the center path.

12. The air conditioning unit of claim 11, further comprising:
    a path contraction formed at a connection between the air inlet and the center path, configured to increase air distribution to the first side path.

13. The air conditioning unit of claim 11, wherein:
    the first and second side paths are tapered so as to become narrower toward front ends thereof.

14. The air conditioning unit of claim 11, further comprising:
    a corner path curved along a corner between the center path and the second side path, the corner path being curved by rounding an outer wall of the corner path.

15. The air conditioning unit of claim 11, further comprising:
    a smoother arranged at each intersection between the center evaporator and the side evaporators, configured to smooth an air flow.

16. The air conditioning unit of claim 4, further comprising:
    a bypass formed for an inner air flow path provided for each of the side evaporators, configured to directly guide at least part of the air passed through the side evaporators into a downstream space behind the heater core by bypassing the heater core; and
    a bypass door arranged in the bypass, configured to open and close the bypass.

17. The air conditioning unit of claim 16, further comprising:
    an air mixing space provided on the downstream side from the heater core, configured to mix air passed through the bypasses with air passed through the heater core.

18. A vehicle comprising:
    an air conditioning system including an air conditioning unit and a fan unit configure to supply air flow to the air conditioning unit,
    the air conditioning unit including:
    an air conditioning casing having air flow paths therein, an inlet and an outlet formed thereon;
    an evaporator arranged in the air conditioning casing and having substantially a U-shape;
    a U-shaped outer air flow path formed between the U-shaped evaporator and the air conditioning casing along the U-shaped evaporator, the outer air flow path being upstream from the U-shaped evaporator in an air flow direction;
    an inner air flow path provided on the inner side of the U-shaped evaporator downstream from the U-shaped evaporator in the air flow direction; and
    a heater core arranged downstream from the U-shaped evaporator in the air flow direction.

19. The vehicle of claim 18, wherein:
    the air conditioning unit is arranged at a widthwise center of the vehicle in an instrument panel in front of a front seat of the vehicle, and the fan unit is arranged beside the air conditioning unit in the widthwise direction of the vehicle.

20. The vehicle of claim 19, wherein:
    an opening of the U-shaped evaporator and the heater core are oriented to the rear of the vehicle, and the air inlet is oriented in a widthwise direction of the vehicle.

21. The vehicle of claim 18 wherein:
    the U-shape outer air flow path has a center path and first and second side paths so as to be in a substantially U-shape.

22. The vehicle of claim 21, wherein:
    the air inlet provided for the air conditioning casing at a corner between the center path of the outer air flow path and the first side path of the outer air flow path, the air inlet configured to guide air in a straight extending direction of the center path.

23. The vehicle of claim 18, wherein:
    the U-shaped evaporator being arranged to open toward a rear of the vehicle, the air inlet being oriented in a widthwise direction of the vehicle, the air conditioning unit and the fan unit being arranged side by side in the widthwise direction of the vehicle.

24. An air conditioning unit, comprising:
    an air conditioning casing formed with an inlet and an outlet, the air conditioning casing allowing an air to flow in the air conditioning casing from the inlet to the outlet;
    an evaporator arranged in the air conditioning casing and having substantially a U-shape;
    a U-Shaped outer air flow path provided on an outer side of the U-shaped evaporator in the air conditioning casing;
    an inner air flow path provided on an inner side of the U-shaped evaporator in the air conditioning casing; and
    a heater core arranged in the air conditioning casing.

* * * * *